United States Patent
Chen et al.

(10) Patent No.: US 12,176,984 B2
(45) Date of Patent: Dec. 24, 2024

(54) BEAM SCHEDULING METHOD AND APPARATUS, DEVICE AND STORAGE MEDIUM

(71) Applicant: DATANG MOBILE COMMUNICATIONS EQUIPMENT CO., LTD., Beijing (CN)

(72) Inventors: Runhua Chen, Beijing (CN); Wei Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 377 days.

(21) Appl. No.: 17/634,995

(22) PCT Filed: Aug. 11, 2020

(86) PCT No.: PCT/CN2020/108499
§ 371 (c)(1),
(2) Date: Feb. 14, 2022

(87) PCT Pub. No.: WO2021/027819
PCT Pub. Date: Feb. 18, 2021

(65) Prior Publication Data
US 2022/0294508 A1    Sep. 15, 2022

(30) Foreign Application Priority Data
Aug. 13, 2019 (CN) .................. 201910745775.4

(51) Int. Cl.
*H04B 17/318* (2015.01)
*H04B 7/06* (2006.01)
*H04W 52/36* (2009.01)

(52) U.S. Cl.
CPC ......... *H04B 7/0626* (2013.01); *H04B 17/318* (2015.01); *H04W 52/36* (2013.01)

(58) Field of Classification Search
None
See application file for complete search history.

(56) References Cited

U.S. PATENT DOCUMENTS

| 2018/0167897 A1* | 6/2018 | Sampath .............. H04W 72/12 |
| 2019/0074854 A1 | 3/2019 | Raghavan et al. |

(Continued)

FOREIGN PATENT DOCUMENTS

| CN | 108810967 A | 11/2018 |
| CN | 109155976 A | 1/2019 |

(Continued)

OTHER PUBLICATIONS

Nokia et al., "Decoupling DL and UL beam selection", 3GPP TSG RAN WG1 Meeting #93, Busan, Korea, Apr. 21-25, 2018, total 2 pages, R1-1807189.

(Continued)

*Primary Examiner* — The Hy Nguyen
(74) *Attorney, Agent, or Firm* — Kilpatrick Townsend & Stockton LLP

(57) ABSTRACT

A beam scheduling method, including: when determining that a terminal has a specified capability, sending indication information to the terminal, the indication information being used to indicate whether the terminal measures RSRP on the basis of the restriction of an uplink MPE, and the specified capability being used to express that the terminal has the capability to measure the RSRP according to the restriction of the MPE; receiving a measurement result for each beam as reported by the terminal on the basis of the indication information; and performing beam scheduling on the basis of the measurement results.

20 Claims, 4 Drawing Sheets

(56) References Cited

U.S. PATENT DOCUMENTS

| | | | |
|---|---|---|---|
| 2019/0149289 A1 | 5/2019 | Abedini et al. | |
| 2021/0298084 A1* | 9/2021 | Taherzadeh Boroujeni | ................ H04W 74/0833 |
| 2021/0399783 A1* | 12/2021 | Onggosanusi | ........ H04W 24/10 |
| 2022/0007269 A1* | 1/2022 | Kaasalainen | ......... H04L 1/1671 |
| 2023/0018795 A1* | 1/2023 | Yuan | .................... H04B 1/3838 |
| 2023/0353219 A1* | 11/2023 | Yu | ........................ H04B 17/327 |
| 2024/0056115 A1* | 2/2024 | Zhou | ...................... H04B 7/063 |

FOREIGN PATENT DOCUMENTS

| | | |
|---|---|---|
| CN | 109391993 A | 2/2019 |
| WO | 2019094139 A1 | 5/2019 |

OTHER PUBLICATIONS

Nokia et al., "Enhancements on Multi-beam Operation", 3GPP TSG RAN WG1 Meeting #97 meeting, Reno, Nevada, USA, May 13-May 17, 2019, total 18 pages, R1-1907317.

Nokia et al., "Remaining Issues on Beam Management", 3GPP TSG RAN WG1 Meeting #93, Busan, Korea, Apr. 21-25, 2018, total 7 pages, R1-1807184.

* cited by examiner

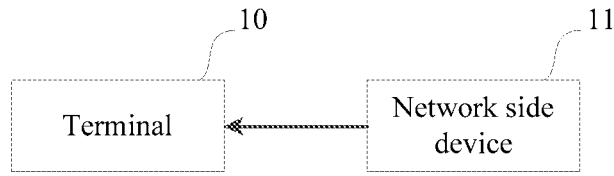

Fig. 1

```
Sending indication information to a terminal when determining that the terminal has
a specified capability, where the indication information is used to indicate whether
the terminal measures RSRP based on a limitation on uplink MPE; and the specified
capability is used to represent that the terminal has a capability to measure the RSRP
                     according to the limitation on the uplink MPE
```
201

Receiving a measurement result for each beam reported by the terminal based on the indication information
202

Performing beam scheduling based on the measurement result
203

Fig. 2

Receiving indication information sent by a base station, where the indication information is used to indicate whether a terminal measures RSRP based on a limitation on uplink MPE
301

Measuring RSRP of each beam according to the indication information, and reporting a measurement result for each beam to the base station
302

Fig. 3

BEAM SCHEDULING METHOD AND APPARATUS, DEVICE AND STORAGE MEDIUM

CROSS-REFERENCE OF RELATED APPLICATIONS

The present disclosure is a National Stage of International Application No. PCT/CN2020/108499, filed Aug. 11, 2020, which claims the priority from Chinese Patent Application No. 201910745775.4, filed with the China National Intellectual Property Administration on Aug. 13, 2019, and entitled "Beam Scheduling Method and Apparatus, Device and Storage Medium", which is hereby incorporated by reference in its entirety.

FIELD

The present disclosure relates to the field of communication technologies, and in particular to a beam scheduling method, apparatus, device and storage medium.

BACKGROUND

Due to the limitation on Maximum Permissible Exposure (MPE) in the uplink, the beam selected based on the maximization of the downlink Reference Signal Received Power (RSRP) may not be applicable to the uplink, for example: due to the limitation on MPE, the maximum transmission power of the uplink is reduced, the transmission power of the uplink needs to be reduced when the beam selected based on the downlink RSRP passes through the human body and when this beam is used for uplink transmission, and then the performance of the uplink transmission is degraded, and even the uplink transmission may fail because the power that needs to be reduced is relatively large.

SUMMARY

Embodiments of the present disclosure provide a beam scheduling method, apparatus, device and storage medium, to select uplink transmission beams and reduce the performance degradation caused by the limitation on MPE.

Embodiments of the present disclosure provide a beam scheduling method, including:
  sending indication information to a terminal when determining that the terminal has a specified capability, where the indication information is used to indicate whether the terminal measures Reference Signal Received Power (RSRP) based on a limitation on uplink Maximum Permissible Exposure (MPE); and the specified capability is used to represent that the terminal has a capability to measure the RSRP based on the limitation on the uplink MPE;
  receiving a measurement result for each beam reported by the terminal based on the indication information; and
  performing beam scheduling based on the measurement result.

The beam scheduling method provided in the foregoing embodiment may be applied to a network-side device. In this way, it is possible to indicate whether the terminal considers the influence of the MPE in a dynamic or semi-static manner during beam measurement and notify the base station that each beam is affected by the MPE, and then the uplink transmission beams can be better scheduled, and the impact on the uplink performance due to the limitation on the MPE can be reduced.

In some embodiments, the indication information is carried in at least one of following information: high-layer signaling; physical layer signaling; or beam reporting format.

The terminal is instructed by the network-side device to measure the RSRP, and whether the beam measurement considers the limitation on the MPE is indicated through one or a combination of the above-mentioned indications, thereby realizing the flexibility of beam scheduling.

In some embodiments, a first configuration is added to the high-layer signaling when the indication information is carried in the high-layer signaling, and the first configuration is included in a Radio Resource Control Information Element (RRC IE).

The indication through high-layer signaling can configure whether the terminal considers the influence of the uplink MPE when measuring the RSRP, thereby realizing the beam scheduling with reference to the influence of the MPE.

In some embodiments, the first configuration is a first parameter added in CSI-ReportConfig, and the first parameter is added when the CSI-ReportConfig satisfies a first specified condition; and
  the first specified condition is that a reportQuantity parameter in the CSI-ReportConfig includes Channel State Information-Reference Signal, CSI-RS, resource index and Reference Signal Received Power (cri-RSRP) or Synchronization signal block index and Reference Signal Received Power (ssb-Index-RSRP).

The indication through high-layer signaling can configure whether the terminal considers the influence of the uplink MPE when measuring the RSRP, thereby realizing the beam scheduling.

In some embodiments, the high-layer signaling is a Medium Access Control Control Element (MAC CE) when the indication information is carried in the high-layer signaling; and the indication information is values of bits reserved in the MAC CE.

The indication through high-layer signaling can configure whether the terminal considers the influence of the uplink MPE when measuring the RSRP, thereby realizing the beam scheduling.

In some embodiments, the physical layer signaling is Downlink Control Information (DCI) when the indication information is carried in the physical layer signaling; and the indication information is values of a specified quantity of bits added in the DCI.

The indication through physical layer signaling can configure whether the terminal considers the influence of the uplink MPE when measuring the RSRP, thereby realizing the beam scheduling.

In some embodiments, when the indication information is carried in the beam reporting format, the indication information is a second parameter added to reportQuantity of CSI-ReportConfig; the second parameter is used to indicate a reporting format; and the second parameter is added when a second specified condition is satisfied; the second specified condition is that the CSI-ReportConfig is a beam measurement report based on a Channel State Information Reference Signal (CSI-RS) or a beam measurement report based on a Synchronization Signal Block (SS-Block).

By indicating the beam reporting format of the terminal by the network side device, it is possible to configure whether the terminal considers the influence of the uplink MPE when measuring the RSRP, thereby realizing the beam scheduling.

In some embodiments, when the indication information indicates that the terminal measures the RSRP based on the limitation on the uplink MPE, the measurement result reported by the terminal includes: a first type of measurement value; or a first type of measurement value and a second type of measurement value, where the first type of measurement value is a measurement value of each beam based on power back-off caused by the limitation on the uplink MPE, and the second type of measurement value is a measurement value of each beam that is not based on the limitation on the uplink MPE.

By indicating the beam reporting format of the terminal by the network side device, it is possible to configure whether the terminal considers the influence of the uplink MPE when measuring the RSRP, thereby realizing the beam scheduling.

In some embodiments, the first type of measurement value reported by the terminal is RSRP or a power back-off value.

By indicating the beam reporting format of the terminal by the network side device, it is possible to configure whether the terminal considers the influence of the uplink MPE when measuring the RSRP, thereby realizing the beam scheduling.

In some embodiments, the first type of measurement value reported by the terminal and the second type of measurement value reported by the terminal are reported in a differential reporting manner.

Through differential reporting, it is possible to know the indicator that each beam considers or does not consider the influence of the uplink MPE, facilitating the network side device to implement beam scheduling according to the indicator.

In some embodiments, the first type of measurement value reported by the terminal and the second type of measurement value reported by the terminal are reported in one of following ways:
   in a first way: ranking by the first type of measurement value, and the first type of measurement value corresponds to the second type of measurement value for each beam, where a measurement value ranked in a first or last position is an absolute value of the measurement value, and measurement values in other ranking positions are differential values;
   in a second way: ranking by the second type of measurement value, and the first type of measurement value corresponds to the second type of measurement value for each beam, where a measurement value in the first or last position is an absolute value of the measurement value, and measurement values in other positions are differential values of measurement values in a same type.

By pre-setting the ranking reference, for example, the first type of measurement value is the ranking reference, and the reported beam is more suitable for the uplink, or the second type of measurement value is the ranking reference, and the reported beam is more suitable for the downlink, facilitating the network side device to implement beam scheduling.

In some embodiments, the indication information is used for at least one Channel State Information (CSI) reporting of: periodic CSI reporting, aperiodic CSI reporting, and semi-persistent CSI reporting.

Through the periodic, aperiodic and semi-persistent CSI reporting described above, the beams can be flexibly scheduled.

In some embodiments, the indication information is sent when at least one of following conditions is satisfied:
   detecting that uplink signal received power of the terminal is lower than a threshold;
   determining that a priority of an uplink service of the terminal is higher than a priority threshold; and
   determining that a priority of an uplink service of the terminal is a specified priority.

In this way, the beams can be flexibly scheduled in a targeted manner according to actual needs.

In some embodiments, whether the terminal has the specified capability is determined according to a physical layer capability parameter of the terminal.

By reporting the physical layer capability parameter of the terminal, it can be known whether the terminal has the capability to consider the influence of the MPE, to better control and instruct the terminal how to report the RSRP.

Embodiments of the present disclosure provide a beam scheduling method, including:
   receiving indication information sent by a base station, where the indication information is used to indicate whether a terminal measures RSRP based on a limitation on uplink MPE;
   measuring RSRP of each beam according to the indication information; and
   reporting a measurement result for each beam to the base station.

In this way, it is possible to indicate whether the terminal considers the RSRP in a dynamic or semi-static manner during beam measurement and notify the base station that each beam is affected by the MPE, and then the uplink transmission beams can be better scheduled, and the impact on the uplink performance due to the limitation on the MPE can be reduced.

Embodiments of the present disclosure provide a beam scheduling method, including:
   receiving a measurement result of a terminal for each beam, where the measurement result includes description information, and the description information is used to indicate whether the measurement result considers power back-off caused by a limitation on uplink MPE; and
   performing beam scheduling based on the measurement result.

In this way, the network side device can perform beam scheduling according to the description information, where the description information indicates whether to consider the power back-off caused by the limitation on the uplink MPE. Based on this, it is convenient for the network side to implement flexible beam scheduling according to the measurement result.

In some embodiments, the description information is represented by a specified quantity of bits.

By selecting a specified quantity of bits to describe the information, it is possible to indicate in the description information whether to consider the power back-off caused by the limitation on the uplink MPE, and based on this, the beams can be flexibly scheduled.

In some embodiments, the measurement result reported by the terminal includes: a first type of measurement value; or a first type of measurement value and a second type of measurement value, where the first type of measurement value is a measurement value of each beam which considers the power back-off caused by the limitation on the uplink MPE, and the second type of measurement value is a measurement value of each beam without considering the power back-off caused by the limitation on the uplink MPE.

By reporting two types of measurement values, it is convenient for the network side device to implement flexible beam scheduling based on the two types of measurement values according to actual needs.

In some embodiments, the first type of measurement value reported by the terminal is RSRP or a power back-off value.

The first type of measurement value reported by the terminal is RSRP or a power back-off value.

In some embodiments, the first type of measurement value reported by the terminal and the second type of measurement value reported by the terminal are reported in a differential reporting manner.

The differential reporting mode is used and then only the measured absolute value of a benchmark value needs to be reported and other values can be reported in the differential form, to inform the network side device of the difference between the first type of measurement values and the difference between the second type of measurement values, facilitate the network side device to perform flexible beam scheduling, and also reduce the number of reported bits.

In some embodiments, the first type of measurement value reported by the terminal and the second type of measurement value reported by the terminal are reported in one of following ways:

in a first way: ranking by the first type of measurement value, and the first type of measurement value corresponds to the second type of measurement value for each beam, where a measurement value ranked in a first or last position is an absolute value of the measurement value, and measurement values in other ranking positions are differential values; and in a second way: ranking by the second type of measurement value, and the first type of measurement value corresponds to the second type of measurement value for each beam, where a measurement value ranked in a first or last position is an absolute value of the measurement value, and measurement values in other ranking positions are differential values of measurement values in a same type.

By ranking according to different criteria, for example, ranking by the magnitude of the first type of measurement value, the network side device can understand the relationship of the first type of measurement values and performs beam scheduling based on this.

Embodiments of the present disclosure provide a beam scheduling method, including:

reporting, by a terminal, a measurement result for each beam when having a capability to measure RSRP according to MPE, and then a base station performs beam scheduling according to the measurement result, where the measurement result includes description information, and the description information is used to indicate whether the measurement considers power back-off caused by a limitation on uplink MPE.

In this way, the network side device can determine whether the result reported by the terminal considers the limitation on the uplink MPE according to the description information, and based on this, it is convenient for the network side device to implement the flexible beam scheduling.

In some embodiments, the terminal determines to report the measurement result with considering the power back-off caused by the limitation on the uplink MPE when detecting human body information and/or determining that an uplink service scenario is a preferred scenario.

In this way, it is convenient for the terminal to flexibly determine when the measurement result considering the power back-off caused by the limitation on the uplink MPE is reported according to requirements.

Embodiment of the present disclosure provide a communication device, including: a processor, a memory and a transceiver; where the processor is configured to read computer instructions in the memory and execute:

sending indication information to a terminal when determining that the terminal has a specified capability, where the indication information is used to indicate whether the terminal measures RSRP based on a limitation on uplink MPE; and the specified capability is used to represent that the terminal has a capability to measure the RSRP according to the limitation on the uplink MPE;

receiving a measurement result for each beam reported by the terminal based on the indication information; and performing beam scheduling based on the measurement result.

In some embodiments, the indication information is carried in at least one of: high-layer signaling; physical layer signaling; and beam reporting format.

In some embodiments, when the indication information is carried in the high-layer signaling, a first configuration is added to the high-layer signaling, and the first configuration is included in an RRC IE.

In some embodiments, the first configuration is a first parameter added in CSI-ReportConfig, and the first parameter is added when the CSI-ReportConfig satisfies a first specified condition; the first specified condition is that a reportQuantity parameter in the CSI-ReportConfig includes cri-RSRP or ssb-Index-RSRP.

In some embodiments, when the indication information is carried in the high-layer signaling, the high-layer signaling is an MAC CE; and the indication information is values of bits reserved in the MAC CE.

In some embodiments, when the indication information is carried in the physical layer signaling, the physical layer signaling is DCI; and the indication information is values of a specified quantity of bits added in the DCI.

In some embodiments, when the indication information is carried in the beam reporting format, the indication information is a second parameter added to reportQuantity of CSI-ReportConfig; the second parameter is used to indicate a reporting format; and the second parameter is added when a second specified condition is satisfied; the second specified condition is that the CSI-ReportConfig is a beam measurement report based on a CSI-RS or a beam measurement report based on an SS-Block.

In some embodiments, when indicating that the terminal measures the RSRP based on the limitation on the uplink MPE, the measurement result reported by the terminal includes: a first type of measurement value; or a first type of measurement value and a second type of measurement value, where the first type of measurement value is a measurement value of each beam based on power back-off caused by the limitation on the uplink MPE, and the second type of measurement value is a measurement value of each beam that is not based on the limitation on the uplink MPE.

In some embodiments, the first type of measurement value reported by the terminal is RSRP or a power back-off value.

In some embodiments, the first type of measurement value reported by the terminal and the second type of measurement value reported by the terminal are reported in a differential reporting manner.

In some embodiments, the first type of measurement value reported by the terminal and the second type of measurement value reported by the terminal are reported in one of following ways:

in a first way: ranking by the first type of measurement value, and the first type of measurement value corresponds to the second type of measurement value for each beam, where a measurement value ranked in a first or last position is an absolute value of the measurement value, and measurement values in other ranking positions are differential values;

in a second way: ranking by the second type of measurement value, and the first type of measurement value corresponds to the second type of measurement value for each beam, where a measurement value ranked in a first or last position is an absolute value of the measurement value, and measurement values in other ranking positions are differential values of measurement values in a same type.

In some embodiments, the indication information is used for at least one CSI reporting of: periodic CSI reporting, aperiodic CSI reporting, semi-persistent CSI reporting.

In some embodiments, the indication information is sent when at least one of following conditions is satisfied:

detecting that the receiving power of the uplink signal at the terminal is lower than a threshold;

determining that a priority of an uplink service of the terminal is higher than a priority threshold; and determining that a priority of an uplink service of the terminal is a specified priority.

In some embodiments, whether the terminal has the specified capability is determined according to a physical layer capability parameter of the terminal.

Embodiments of the present disclosure provide a communication device, including: a processor, a memory and a transceiver; where the processor is configured to read computer instructions in the memory and execute:

receiving indication information sent by a base station, where the indication information is used to indicate whether a terminal measures RSRP based on a limitation on uplink MPE;

measuring RSRP of each beam according to the indication information; and reporting a measurement result for each beam to the base station.

Embodiment of the present disclosure provide a communication device, including: a processor, a memory and a transceiver; where the processor is configured to read computer instructions in the memory and execute:

receiving a measurement result of a terminal for each beam, where the measurement result includes description information, and the description information is used to indicate whether the measurement result considers power back-off caused by a limitation on uplink MPE; and performing beam scheduling based on the measurement result.

In some embodiments, the description information is represented by a specified quantity of bits.

In some embodiments, the measurement result reported by the terminal includes: a first type of measurement value; or a first type of measurement value and a second type of measurement value, where the first type of measurement value is a measurement value of each beam considering the power back-off caused by the limitation on the uplink MPE, and the second type of measurement value is a measurement value of each beam without considering the power back-off caused by the limitation on the uplink MPE.

In some embodiments, the first type of measurement value reported by the terminal is RSRP or a power back-off value.

In some embodiments, the first type of measurement value reported by the terminal and the second type of measurement value reported by the terminal are reported in a differential reporting manner.

In some embodiments, the first type of measurement value reported by the terminal and the second type of measurement value reported by the terminal are reported in one of the following ways:

in a first way: ranking by the first type of measurement value, and the first type of measurement value corresponds to the second type of measurement value for each beam, where a measurement value ranked in a first or last position is an absolute value of the measurement value, and measurement values in other ranking positions are differential values;

in a second way: ranking by the second type of measurement value, and the first type of measurement value corresponds to the second type of measurement value for each beam, where a measurement value ranked in a first or last position is an absolute value of the measurement value, and measurement values in other ranking positions are differential values of measurement values in a same type.

Embodiments of the present disclosure provide a communication device, including: a processor, a memory and a transceiver; where the processor is configured to read computer instructions in the memory and execute:

reporting, by a terminal, a measurement result for each beam when having a capability to measure RSRP according to MPE, and then a base station performs beam scheduling according to the measurement result, where the measurement result includes description information, and the description information is used to indicate whether the measurement considers power back-off caused by a limitation on uplink MPE.

In some embodiments, the terminal determines to report the measurement result considering the power back-off caused by the limitation on the uplink MPE when detecting human body information and/or determining that an uplink service scenario is a preferred scenario.

Embodiments of the present disclosure provide a network side device, including:

an indication device configured to send indication information to a terminal when determining that the terminal has a specified capability, where the indication information is used to indicate whether the terminal measures RSRP based on a limitation on uplink MPE; and the specified capability is used to represent that the terminal has a capability to measure the RSRP according to the limitation on the uplink MPE;

a receiving device configured to receive a measurement result for each beam reported by the terminal based on the indication information; and a beam scheduling device configured to perform beam scheduling based on the measurement result.

Embodiments of the present disclosure provide a terminal, including:

a receiving device configured to receive indication information sent by a base station, where the indication information is used to indicate whether a terminal measures RSRP based on a limitation on uplink MPE; and an indication device configured to measure RSRP of each beam according to the indication information, and report a measurement result for each beam to the base station.

Embodiments of the present disclosure provide a network side device, including:

a receiving device configured to receive a measurement result of a terminal for each beam, where the measurement result includes description information, and the description information is used to indicate whether the measurement result considers power back-off caused by a limitation on uplink MPE; and a beam scheduling device configured to perform beam scheduling based on the measurement result.

Embodiments of the present disclosure provide a terminal, including:

a reporting device configured to report a measurement result for each beam when the terminal has a capability to measure RSRP according to MPE, and then a base station performs beam scheduling according to the measurement result, where the measurement result includes description information, and the description information is used to indicate whether the measurement considers power back-off caused by a limitation on uplink MPE.

Embodiments of the present disclosure provide a computer readable storage medium on which a computer program is stored, where the program, when executed by a processor, implements the steps of any beam scheduling method described above.

BRIEF DESCRIPTION OF THE DRAWINGS

In order to illustrate the embodiments of the disclosure more clearly, the accompanying figures which need to be used in embodiments of the disclosure will be introduced below briefly. The accompanying figures introduced below are only some embodiments of the disclosure, and other accompanying figures according to these accompanying figures.

FIG. 1 is a structure diagram of a system according to an embodiment of the disclosure;

FIG. 2 is a schematic diagram of a beam scheduling method of a network side device according to an embodiment of the disclosure;

FIG. 3 is a schematic diagram of a beam scheduling method of a terminal according to an embodiment of the disclosure;

Figure 4:
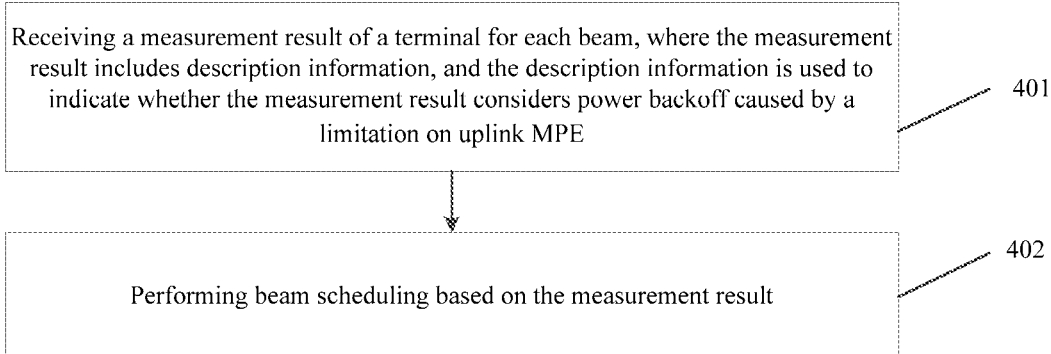
FIG. 4 is a schematic diagram of a beam scheduling method of a network side device according to an embodiment of the disclosure.

DETAILED DESCRIPTION OF THE EMBODIMENTS (1) Network side device is a device that provides the wireless communication function for the terminal, including but not limited to: gNB in 5G, Radio Network Controller (RNC), Node B (NB), Base Station Controller (BSC), Base Transceiver Station (BTS), home base station (for example, home evolved NodeB or Home Node B (HNB)), Base Band Unit (BBU), Transmission and Reception Point (TRP), Transmitting Point (TP), mobile switching center, etc. The base station in the disclosure may also be a device that provides the wireless communication function for the terminal in other communication systems that may appear in the future.

(2) Terminal is a device that can provide users with voice and/or data connectivity. For example, the terminal device includes a handheld device with wireless connection function, a vehicle-mounted device, etc. At present, the terminal device may be: mobile phone, tablet, laptop, palmtop computer, Mobile Internet Device (MID), wearable device, Virtual Reality (VR) device, Augmented Reality (AR) device, wireless terminal in the industrial control, wireless terminal in the self-driving, wireless terminal in the smart grid, wireless terminal in the transportation safety, wireless terminal in the smart city, or wireless terminal in the smart home, etc.

Considering the safety of millimeter wave radiation penetrating the human body, the Federal Communications Commission (FCC) stipulates the Maximum Permissible Exposure (MPE) to avoid excessive radio radiation from penetrating the human body. When there is a human body around a terminal, the uplink transmission power of the terminal should be reduced.

At present, in order to meet the MPE standard, two power back-off schemes have been adopted. One is Maximum Power Reduction (MPR), where a terminal reduces the maximum transmit power according to whether there is a human body around it detected by a sensor. The other is maximum uplink on duty cycle (maxUplinkDutyCycle) scheme, where the proportion of symbols that can be scheduled for uplink transmission in a period is configured for a terminal, and the configurable proportions are {60%, 70%, 80%, 90%, 100%}; when the proportion is lower than 100%, some uplink symbols cannot be used for transmission, reducing the radiation quantity of the terminal. The above two schemes both meet the MPE by reducing the transmit power of the terminal, but both schemes have an impact on the uplink performance.

Currently, the beam measurement and reporting are mainly based on the principle of maximizing the RSRP. When the uplink and downlink beams have reciprocity, the beam measured based on the downlink pilot beam is usually also used for uplink transmission, that is, the downlink receiving beam is used as the uplink sending beam. For the downlink pilot, it is not restricted by the MPE, and the beam is selected based on the maximum downlink RSRP; for the uplink, it is possible that the maximum permissible transmit power is very low due to the influence of the MPE, and then the uplink performance when this beam is used for transmission is relatively poor. Even when the uplink and downlink beams have reciprocity, the beam selected based on the maximum downlink RSRP may still be unsuitable for uplink.

Due to the limitation on MPE in the uplink, the beam selected based on the maximum downlink RSRP may not be suitable for the uplink. For example, due to the limitation on MPE, the maximum transmit power of the uplink is reduced. When the beam selected based on the downlink RSRP passes through the human body, the uplink transmit power needs to be reduced when this beam is used for uplink transmission, resulting in a decrease in uplink performance.

In view of this, embodiments of the present disclosure provide a solution. In the process of describing the embodiments of the present disclosure, the implementations of a system formed by a network side device and a terminal will be illustrated to better understand the implementations of the solution given in embodiments of the present disclosure. Then, the examples in which they are implemented separately will also be given respectively. However, such illustration does not mean they must implement in cooperation or must implement alone. Actually, when the terminal and the network side device implement separately, they also solve the problems at the terminal side and the network side device respectively, while the better effect may be obtained when they are used in combination.

It should also be noted that the behaviors of the network side device are generally correspond to those on the terminal side, so the description will be focus on the system for the sake of simplicity.

Referring to FIG. 1, the embodiment of the present disclosure is applied to a communication system, which includes a network side device 11 and a terminal 10. The beam scheduling is performed mainly through the following embodiments.

In embodiments of the present disclosure, in the measurement and reporting process of beam management, different uplink and downlink requirements are taken into consideration, e.g., the uplink power back-off caused by the uplink MPE. The base station instructs the terminal or the terminal selects and notifies the base station according to the specific situation and then it is determined whether the beam measurement and selection process considers the limitation in uplink, to better perform downlink and uplink beam scheduling. Different modes will be explained one by one below.

In a first mode: the terminal reports a beam measurement result based on an instruction from the base station, and the base station performs beam scheduling based on the measurement result.

The base station sends the indication information to the terminal when determining that the terminal has a specified capability, where the indication information is used to indicate whether the terminal measures the RSRP based on a limitation on the uplink MPE, and the specified capability is used to represent that the terminal has a capability to measure the RSRP according to the limitation on the uplink MPE; receives a measurement result for each beam reported by the terminal based on the indication information; and performs beam scheduling based on the measurement result.

For example, when the terminal can detect whether there is a human body nearby through a sensor and can determine the power back-off in each beam direction due to the limitation on the MPE, the terminal reports to the base station that the terminal has a capability to measures the RSRP according to the MPE, and the base station configures whether to measure and report the beam and the RSRP considering the MPE according to the terminal's capability.

When the terminal reports whether it has the capability to measure the RSRP according to the MPE (hereinafter referred to as capability to consider the limitation on MPE), a parameter may be added to the physical layer capability parameters of the terminal to indicate whether the terminal has the capability to consider MPE. Here, the physical layer capability parameters may be as shown in Table 1:

TABLE 1

Table of physical layer capability parameters of terminal

| Definitions of physical layer parameters (Phy-Parameters Definitions for parameters) | Each (per) | Whether to force (M) | Whether FDD is different from TDD (FDD-TDD DIFF) | Whether Band 1 is different from Band 2 (FR1-FR2 DIFF) |
| --- | --- | --- | --- | --- |
| humanBody-detection Indicate whether the terminal supports detection of surrounding human body and can determine power back-off value due to MPE limitation | Terminal | No | No | No |

After knowing whether the terminal has the capability to consider MPE, the base station may instruct the terminal whether it needs to consider the uplink characteristics (such as the capability to consider MPE) when measuring the RSRP according to the scenario and service model; or the base station may instruct the terminal whether it needs to consider the uplink characteristics (such as the capability to consider MPE) when the base station detects that the uplink signal received power of the terminal is very low.

When the base station instructs the terminal, it may instruct the terminal through high-layer signaling or physical layer signaling. In the procedure of instructing, different terminals may instruct in different ways. For example, the terminal 1 instructs through physical layer signaling, and the terminal 2 instructs through high-layer signaling. In another example, the same terminal is instructed in different time periods in different ways. For example, the physical layer signaling is used to instruct in the first time period, and the high-layer signaling is used to instruct in the second time period. Different beam reporting formats may be indicated in different ways. For example, a beam reporting format may be indicated by high-layer signaling, and another beam reporting format may be indicated by physical signaling. After receiving the instruction, the terminal does not consider or consider the MPE corresponding to each beam when measuring the RSRP according to the instruction of the base station, and reports the measurement result to the base station. Then, the base station performs beam scheduling according to the measurement result reported by the terminal. The above three indication modes will be described respectively below.

Embodiment 1: Indicate Through High-Layer Signaling.

Two following implementations may be included.

Mode 1: High-Layer Signaling Indication.

It should be noted that a first configuration is added to the high-layer signaling when the high-layer signaling is used for indication and when the indication information is carried in the high-layer signaling, where the first configuration is included in an RRC IE. The first configuration is a first parameter added in CSI-ReportConfig, and the first parameter is added when the CSI-ReportConfig satisfies a first specified condition; the first specified condition is that a reportQuantity parameter in the CSI-ReportConfig includes cri-RSRP or ssb-Index-RSRP; and the first parameter includes a first parameter value and a second parameter value. When the first parameter is configured as the first parameter value, it is used to indicate that the terminal measures the RSRP based on the limitation on the uplink MPE; when the first parameter is configured as the second parameter value, it is used to indicate that the terminal dose not measure the RSRP based on the limitation on the uplink MPE.

That will be illustrated by specific examples, where MPEBasedReporting is the first parameter, configured is the first parameter value, and notConfigured is the second parameter value. When RRC IE CSI-ReportConfig is configured and when the reportQuantity of the CSI-ReportConfig is cri-RSRP or ssb-Index-RSRP, an additional configuration is added to indicate whether the terminal considers the uplink characteristics. The specific implementation may be achieved by the following codes, and the specific implementation may be achieved by codes with underlines, but it is not limited thereto:

persistent CSI reporting is divided into two types: semi-persistent reporting on PUCCH (semiPersistentOnPUCCH) reported by PUCCH and semi-persistent reporting on PUSCH (semiPersistentOnPUSCH) reported by Physical Uplink Shared Channel (PUSCH), where the former is activated by the MAC CE, and the latter is activated by the CSI request in the DCI.

When the base station detects that the uplink signal received power of the terminal is very low or the uplink service has high priority, the base station may indicate through the MAC CE that the semi-persistent CSI reporting needs to consider the power back-off due to the limitation on the MPE.

Therefore, the high-layer signaling may also be an MAC CE; when the MAC CE is used for indication, the indication information is the values of the bits reserved in the MAC CE.

The way to indicate through the MAC CE that the semi-persistent CSI reporting needs to consider the power back-off due to the limitation on the MPE is as follows.

Through the reserved bit R in the CSI reporting on PUCCH Activation/Deactivation MAC CE of the existing standard, R in the existing standard is the reserved bit that is always 0. This bit is used to indicate whether to consider

```
CSI-ReportConfig   ::=                  SEQUENCE {
   reportConfigId                          CSI-ReportConfigId,
   reportQuantity                          CHOICE {
      none                                    NULL,
      cri-RI-PMI-CQI                          NULL,
      cri-RI-i1                               NULL,
      cri-RI-i1-CQI                           SEQUENCE {
         pdsch-BundleSizeForCSI                  ENUMERATED {n2, n4}
OPTIONAL -- Need S
      },
      cri-RI-CQI                              NULL,
      cri-RSRP                                NULL,
      ssb-Index-RSRP                          NULL,
      cri-RI-LI-PMI-CQI                       NULL
   },
   groupBasedBeamReporting                 CHOICE {
      enabled                                 NULL,
      disabled                                SEQUENCE {
         nrofReportedRS                          ENUMERATED {n1, n2,
n3, n4}                                 OPTIONAL -- Need S
   MPEBasedReporting ENUMERATED {configured, notConfigured}, OPTIONAL --
Need S
   }.
```

After receiving the CSI-ReportConfig, the terminal measures the RSRP of each beam according to the configured measurement pilot resources. If MPEBasedReporting is configured, the power back-off in the beam direction due to the limitation on the MPE is considered when measuring the RSRP; otherwise, it is not considered. After receiving the beam and the RSRP reported by the terminal, the base station may perform downlink and uplink scheduling according to whether the reported beam considers the power back-off due to the limitation on the MPE. The base station may configure multiple CSI-ReportConfigs for the terminal. Some consider the limitation on the MPE, and some do not consider the limitation on the MPE. Then the terminal may measure and report according to the configuration of CSI-ReportConfig to determine the uplink and downlink beams respectively.

Mode 2: High-Layer Signaling Indication.

In the existing standard, the periodic CSI reporting is configured by RRC, and the CSI is reported periodically; the aperiodic CSI reporting is indicated by DCI; and the semithe power back-off caused by the limitation on the MPE. When the value of R is 1, it indicates that the terminal will consider the power back-off caused by the limitation on the MPE when measuring the RSRP, as shown in Table 2.

TABLE 2

Table of bit setting indicated by MAC CE

| R | Serving Cell ID | | | | | | BWP ID |
|---|---|---|---|---|---|---|---|
| S7 | S7 | S7 | S7 | S7 | S7 | S7 | S7 |

After receiving the MAC CE, the terminal activates the corresponding CSI reporting, and determines whether to consider the power back-off caused by the MPE according to the configuration when measuring the RSRP. After receiving the beam and the RSRP reported by the terminal, the base station may perform downlink and uplink scheduling according to whether the reported beam considers the power back-off due to the MPE limitation in combination with the traditional periodic reported beam and RSRP.

Embodiment 2: Indicate Through Physical Layer Signaling.

It should be noted that the physical layer signaling is DCI when the physical layer signaling is used for indication; and the indication information is values of a specified quantity of bits added in the DCI.

As mentioned above, in the existing standard, the periodic CSI reporting is configured by RRC, and the CSI is reported periodically; the aperiodic CSI reporting is indicated by DCI; and the semi-persistent CSI reporting is divided into two types: semiPersistentOnPUCCH reported by PUCCH and semiPersistentOnPUSCH reported by PUSCH, where the former is activated by the MAC CE, and the latter is activated by the CSI request in the DCI.

When the base station detects that the uplink signal received power of the terminal is very low or the uplink service has high priority, the base station may also indicate through the DCI that the aperiodic CSI reporting needs to consider the power back-off due to the limitation on the MPE, in addition to indicating through the MAC CE in the high-layer signaling.

The way to indicate through the DCI that the semi-persistent CSI reporting needs to consider the power back-off due to the limitation on the MPE is as follows: 1 bit may be added to the DCI to indicate whether the activated CSI reporting needs to consider the power back-off due to the limitation on the MPE. Of course, the number of bits added is not limited.

Embodiment 3: Indicate the Beam Reporting Format of the Terminal.

It should be noted that the indication information is a second parameter added to reportQuantity of CSI-Report-Config when the indication information is carried in the beam reporting format; the second parameter is used to indicate a reporting format; and the second parameter is added when a second specified condition is satisfied; the second specified condition is that the CSI-ReportConfig is a beam measurement report based on a CSI-RS or a beam measurement report based on an SS-Block; when the second parameter is configured as a first sub-parameter, it is used to indicate that the terminal measures the RSRP based on the limitation on the uplink MPE; when the second parameter is configured as a second sub-parameter, it is used to indicate that the terminal dose not measure the RSRP based on the limitation on the uplink MPE.

In some embodiments, that may be implemented by the following codes, where the added second parameter is marked with underline:

The second parameter may be two sub-parameters: the first sub-parameter and the second sub-parameter, where the first sub-parameter may indicate that the terminal measures the RSRP based on the limitation on the uplink MPE. In addition, two reporting forms may be obtained according to the first sub-parameter. After the terminal receives the configuration of the base station and when the configured reportQuantity is the first sub-parameter cri-RSRP-1 or ssb-Index-RSRP-1, the RSRP of each beam is measured according to the configured measurement pilot resources, where one considers the MPE limitation and the other is not based on the influence of the power back-off caused by the MPE limitation on the RSRP; when the configured reportQuantity is the first sub-parameter cri-RSRP-2 or ssb-Index-RSRP-2, the RSRP of each beam is measured according to the configured measurement pilot resources, where one is not based on the MPE limitation and the other needs to consider the influence of the power back-off caused by the MPE limitation on the RSRP; when the configured reportQuantity is the second sub-parameter cri-RSRP-3 or ssb-Index-RSRP-3, the influence of the MPE limitation is not considered. Furthermore, it should be noted that the above reportQuantity is only an implementation, and specific implementations are not limited to the above implementation. It is also possible to meet requirements by naming in other ways for distinguishing.

It should be noted that the base station may indicate the periodic CSI reporting, aperiodic CSI reporting or semi-persistent CSI reporting to the terminal for scheduling beams in Embodiment 1, Embodiment 2 and Embodiment 3.

When indicating that the terminal considers the power back-off caused by the limitation on the uplink MPE when measuring the RSRP, the measurement result reported by the terminal may include: a first type of measurement value; or a first type of measurement value and a second type of measurement value, where the first type of measurement value is a measurement value of each beam with considering the power back-off caused by the limitation on the uplink MPE, and the second type of measurement value is a measurement value of each beam without considering the power back-off caused by the limitation on the uplink MPE. Here, the first type of measurement value reported by the terminal is RSRP or a power back-off value; and the first type of measurement value and the second type of measurement value reported by the terminal are reported in a differential reporting manner.

```
CSI-ReportConfig::=              SEQUENCE {
  reportConfigId                 CSI-ReportConfigId,
  reportQuantity                 CHOICE {
    none                             NULL,
    cri-RI-PMI-CQI                   NULL,
    cri-RI-i1                        NULL,
    cri-RI-i1-CQI                    SEQUENCE {
      pdsch-BundleSizeForCSI             ENUMERATED {n2, n4}
OPTIONAL -- Need S
    },
    cri-RI-CQI                       NULL,
    cri-RSRP                         NULL,
    ssb-Index-RSRP                   NULL,
      cri-RSRP-2                         NULL,
    ssb-Index-RSRP-2                   NULL,
    cri-RI-LI-PMI-CQI                NULL
  }
}.
```

The first type of measurement value and the second type of measurement value reported by the terminal are reported in one of the following ways.

In a first way: ranking by the first type of measurement value, and the first type of measurement value corresponds to the second type of measurement value for each beam, where a measurement value ranked in the first or last position is an absolute value of the measurement value, and measurement values in other ranking positions are differential values.

For example, the terminal reports two types of RSRP, the first type is RSRP that considers the MPE limitation, and the second type is RSRP that does not consider the MPE limitation. When a plurality of beams are reported, each type of RSRP is reported separately. When sorting by the RSRP considering the MPE, the beam corresponding to the maximum RSRP considering the MPE is a first beam, and the absolute value is reported for the maximum RSRP considering the MPE, where the range is [−140, −44]. The RSRP that does not consider the MPE corresponding to this beam also has an absolute value range of [−140, −44], and two types of RSRP corresponding to other beams are respectively reported differentially from the same type of RSRP corresponding to the first beam.

If the terminal reports two types of RSRP, the first type of RSRP is a power back-off value, and the second type of RSRP is RSRP that does not consider the MPE limitation. When multiple beams are reported, each type of RSRP is reported separately. When sorting by the power back-off value, the beam corresponding to the minimum power back-off value is a first beam, and the absolute value of the power back-off value is reported for the maximum RSRP considering the MPE, where the range is [0, 7]. The RSRP that does not consider the MPE corresponding to this beam also has an absolute value range of [−140, −44], and two types of RSRP corresponding to other beams are respectively reported differentially from the same type of RSRP corresponding to the first beam.

In a second way: ranking by the second type of measurement value, and the first type of measurement value corresponds to the second type of measurement value for each beam, where a measurement value ranked in a first or last position is a measured absolute value, and measurement values in other ranking positions are differential values of measurement values in a same type.

For example, the terminal reports two types of RSRP, the first type of RSRP is RSRP that considers the MPE limitation, and the second type of RSRP is RSRP that does not consider the MPE limitation. When multiple beams are reported, each type of RSRP is reported separately. When sorting by the RSRP that does not consider the MPE, the beam corresponding to the maximum RSRP that does not consider the MPE is a first beam, and the absolute value is reported for the maximum RSRP that does not consider the MPE, where the range is [−140, −44]. The RSRP considering the MPE corresponding to this beam also has an absolute value range of [−140, −44], and two types of RSRP corresponding to other beams are respectively reported differentially from the same type of RSRP corresponding to the first beam.

If the terminal reports two types of RSRP, the first type of RSRP is a power back-off value, and the second type of RSRP is RSRP that does not consider the MPE limitation. When multiple beams are reported, each type of RSRP is reported separately. When sorting by the RSRP that does not consider the MPE limitation, the beam corresponding to the maximum RSRP that does not consider the MPE is a first beam, and the absolute value is reported for the maximum RSRP that does not consider the MPE, where the range is [−140, −44]. The RSRP considering the MPE corresponding to this beam also has a power back-off value range of [0, 7], and two types of RSRP corresponding to other beams are respectively reported differentially from the same type of RSRP corresponding to the first beam.

When multiple beams are reported, each type of RSRP is reported separately. When sorting by the RSRP that does not consider the MPE, the beam corresponding to the maximum RSRP that does not consider the MPE is a first beam, and the absolute value is reported for the maximum RSRP that does not consider the MPE, where the range is [−140, −44]. The RSRP that does not consider the MPE limitation corresponding to other beams is reported differentially from the same type of RSRP corresponding to the first beam. For each beam reported, the power back-off value caused by the MPE limitation corresponding to this beam is reported at the same time.

After receiving the CSI report of the terminal, the base station may determine the beams applicable to the downlink and the beams considering the uplink MPE limitation applicable to the uplink simultaneously, to perform downlink and uplink beam scheduling.

In a second way: perform beam scheduling based on the description information of the terminal.

The terminal reports a measurement result for each beam when having a capability to measure the RSRP according to the MPE, and then the base station performs beam scheduling according to the measurement result, where the measurement result includes the description information that is used to indicate whether the measurement considers the power back-off caused by a limitation on the uplink MPE.

In some embodiments, the terminal determines whether to consider the limitation on the uplink MPE when measuring the RSRP according to the scenario and service. If the terminal detects the presence of a human body around it through a sensor, or in a scenario where uplink services are prioritized, the influence of the MPE on the uplink transmit power needs to be considered. In order to select the optimal uplink beam, the influence of the power back-off corresponding to the MPE needs to be considered for each beam when the RSRP of each beam is calculated. When the MPE is not considered, the RSRPs of the beam 1 and beam 2 are RSRP1a and RSRP2a respectively. When the beam 1 and beam 2 are respectively used to transmit uplink signals, the corresponding power back-offs due to the limitation on MPE are x1dB and x2dB respectively. Then the RSRPs of the beam 1 and beam 2 are RSRP1b=RSRP1a-x1 and RSRP2b=RSRP2a-x2 respectively after the MPE is considered. After measuring the RSRP of each beam, the terminal determines the reported beam according to the criterion of maximum RSRP. According to the criterion of maximum RSRP, the reported beam selected by the terminal is beam 1 when the MPE is not considered; and the reported beam selected by the terminal is beam 2 when the MPE is considered.

During reporting, the terminal may report the beams and RSRPs considering the MPE or not through different reporting slots, or may report only one type of beam and RSRP considering the MPE or not as needed. In order for the base station to better schedule the uplink and downlink beams, there is a need to inform the base station of whether the reported beam and RSRP consider uplink characteristics such as MPE. In order to distinguish whether the reported beam and RSRP consider the MPE, a mark of whether the MPE is considered is reported when the CRI/SSBRI and RSRP are reported. This mark is indicated by 1 bit, where 0 means that the uplink characteristic is not considered, and 1 means that the uplink characteristic is considered. The base station performs beam scheduling according to the beam and the MPE mark reported by the terminal.

Furthermore, it should be noted that the beam reporting method described in the foregoing Embodiment 3 may still be used when the terminal performs beam reporting, which will not be repeated here.

Referring to FIG. 2, it is a schematic flowchart of a beam scheduling method according to an embodiment of the present disclosure, and the method includes:

Step 201: sending indication information to a terminal when determining that the terminal has a specified capability, where the indication information is used to indicate whether the terminal measures RSRP based on a limitation on uplink MPE; and the specified capability is used to represent that the terminal has a capability to measure the RSRP according to the limitation on the uplink MPE;

Step 202: receiving a measurement result for each beam reported by the terminal based on the indication information; and Step 203: performing beam scheduling based on the measurement result.

In one embodiment, the indication information is carried in at least one of:
high-layer signaling;
physical layer signaling; and
beam reporting format.

In some embodiments, when the indication information is carried in the high-layer signaling, a first configuration is added to the high-layer signaling, and the first configuration is included in an RRC IE.

In some embodiments, the first configuration is a first parameter added in CSI-ReportConfig, and the first parameter is added when the CSI-ReportConfig satisfies a first specified condition.

The first specified condition is that a reportQuantity parameter in the CSI-ReportConfig includes cri-RSRP or ssb-Index-RSRP.

In some embodiments, when the indication information is carried in the high-layer signaling, the high-layer signaling is an MAC CE; and the indication information is values of bits reserved in the MAC CE.

In some embodiments, when the indication information is carried in the physical layer signaling, the physical layer signaling is DCI; and the indication information is values of a specified quantity of bits added in the DCI.

In some embodiments, when the indication information is carried in the beam reporting format, the indication information is a second parameter added to reportQuantity of CSI-ReportConfig; the second parameter is used to indicate a reporting format; and the second parameter is added when a second specified condition is satisfied; the second specified condition is that the CSI-ReportConfig is a beam measurement report based on a CSI-RS or an SS-Block.

In some embodiments, when indicating that the terminal measures the RSRP based on the limitation on the uplink MPE, the measurement result reported by the terminal includes: a first type of measurement value; or a first type of measurement value and a second type of measurement value, where the first type of measurement value is a measurement value of each beam based on power back-off caused by the limitation on the uplink MPE, and the second type of measurement value is a measurement value of each beam that is not based on the limitation on the uplink MPE.

In some embodiments, the first type of measurement value reported by the terminal is RSRP or a power back-off value.

In some embodiments, the first type of measurement value reported by the terminal and the second type of measurement value reported by the terminal are reported in a differential reporting manner.

In some embodiments, the first type of measurement value reported by the terminal and the second type of measurement value reported by the terminal are reported in one of following ways:

in a first way: ranking by the first type of measurement value, and the first type of measurement value corresponds to the second type of measurement value for each beam, where a measurement value ranked in a first or last position is an absolute value of the measurement value, and measurement values in other ranking positions are differential values;

in a second way: ranking by the second type of measurement value, and the first type of measurement value corresponds to the second type of measurement value for each beam, where a measurement value ranked in a first or last position is an absolute value of the measurement value, and measurement values in other ranking positions are differential values of measurement values in a same type.

In some embodiments, the indication information is used for at least one CSI reporting of: periodic CSI reporting, aperiodic CSI reporting, semi-persistent CSI reporting.

In some embodiments, the indication information is sent when at least one of following conditions is satisfied:
detecting that uplink signal received power of the terminal is lower than a threshold;
determining that a priority of an uplink service of the terminal is higher than a priority threshold; and
determining that a priority of an uplink service of the terminal is a specified priority.

In some embodiments, whether the terminal has the specified capability is determined according to a physical layer capability parameter of the terminal.

Referring to FIG. 3, it is a schematic diagram of a beam scheduling method according to an embodiment of the present disclosure, and the method includes:

Step 301: receiving indication information sent by a base station, where the indication information is used to indicate whether a terminal measures RSRP based on a limitation on uplink MPE; and Step 302: measuring RSRP of each beam according to the indication information, and reporting a measurement result for each beam to the base station.

Referring to FIG. 4, it is a schematic diagram of a beam scheduling method according to an embodiment of the present disclosure, and the method includes:

Step 401: receiving a measurement result of a terminal for each beam, where the measurement result includes description information, and the description information is used to indicate whether the measurement result considers power back-off caused by a limitation on uplink MPE;

Step 402: performing beam scheduling based on the measurement result.

In some embodiments, the description information is represented by a specified quantity of bits.

In some embodiments, the measurement result reported by the terminal includes: a first type of measurement value; or a first type of measurement value and a second type of measurement value, where the first type is a measurement value of each beam with considering the power back-off caused by the limitation on the uplink MPE, and the second type is a measurement value of each beam without considering the power back-off caused by the limitation on the uplink MPE.

In some embodiments, the first type of measurement value reported by the terminal is RSRP or a power back-off value.

In some embodiments, the first type of measurement value reported by the terminal and the second type of measurement value reported by the terminal are reported in a differential reporting manner.

In some embodiments, the first type of measurement value reported by the terminal and the second type of measurement value reported by the terminal are reported in one of following ways:
- in a first way: ranking by the first type of measurement value, and the first type of measurement value corresponds to the second type of measurement value for each beam, where a measurement value ranked in a first or last position is an absolute value of the measurement value, and measurement values in other ranking positions are differential values;
- in a second way: ranking by the second type of measurement value, and the first type of measurement value corresponds to the second type of measurement value for each beam, where a measurement value ranked in a first or last position is an absolute value of the measurement value, and measurement values in other ranking positions are differential values of measurement values in a same type.

Figure 5:
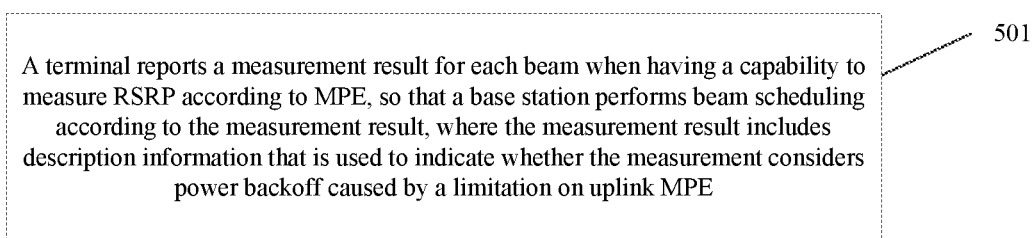
FIG. 5 is a schematic diagram of a beam scheduling method of a terminal according to an embodiment of the disclosure.

Referring to FIG. 5, it is a schematic diagram of a beam scheduling method according to an embodiment of the present disclosure, and the method includes:
- Step 501: a terminal reports a measurement result for each beam when having a capability to measure RSRP according to MPE, and then a base station performs beam scheduling according to the measurement result, where the measurement result includes description information, and the description information is used to indicate whether the measurement considers power back-off caused by a limitation on uplink MPE.

In some embodiments, the terminal determines to report the measurement result with considering the power back-off caused by the limitation on the uplink MPE when detecting human body information and/or determining that an uplink service scenario is a preferred scenario.

Figure 6:
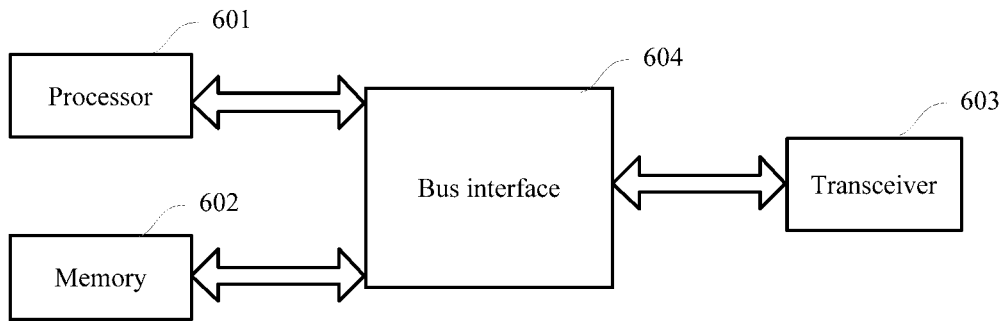
FIG. 6 is a structural schematic diagram of a communication device according to an embodiment of the disclosure.

Based on the same inventive concept, referring to FIG. 6, it is a structural schematic diagram of a communication device according to an embodiment of the disclosure. As shown, the communication device may include: a processor 601, a memory 602, a transceiver 603 and a bus interface 604.

The processor 601 is responsible for managing the bus architecture and general processing, and the memory 602 may store the data used by the processor 601 when performing the operations. The transceiver 603 is configured to receive and send the data under the control of the processor 601.

The bus architecture may include any numbers of interconnected buses and bridges, and specifically link various circuits of one or more processors represented by the processor 601 and the memory represented by the memory 602. The bus architecture may further link various other circuits such as peripheral device, voltage regulator and power management circuit, which are all well known in the art and thus will not be further described again herein. The bus interface provides an interface. The processor 601 is responsible for managing the bus architecture and general processing, and the memory 602 may store the data used by the processor 601 when performing the operations.

The procedure disclosed by embodiments of the present disclosure may be applied in the processor 601 or implemented by the processor 601. In the implementation process, each step of the signal processing flow may be completed by the integrated logic circuit of hardware in the processor 601 or the instruction in the form of software. The processor 601 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in embodiments of the present disclosure. The general-purpose processor may be a microprocessor or any conventional processor or the like. The steps of the method disclosed in combination with the embodiments of the present disclosure may be directly completed by a hardware processor or completed by a combination of hardware and software modules in the processor. The software modules may be located in the random-access memory, flash memory, read only memory, programmable read only memory or electrically erasable programmable read only memory, register and other mature storage medium in the art. The storage medium is located in the memory 602, and the processor 601 reads the information in the memory 602 and completes the steps of the signal processing flow in combination with its hardware.

In some embodiments, the processor 601 is configured to read computer instructions in the memory 602 and perform the following process:
- sending indication information to a terminal when determining that the terminal has a specified capability, where the indication information is used to indicate whether the terminal measures RSRP based on a limitation on uplink MPE; and the specified capability is used to represent that the terminal has a capability to measure the RSRP according to the limitation on the uplink MPE.
- receiving a measurement result for each beam reported by the terminal based on the indication information; and
- performing beam scheduling based on the measurement result.

In some embodiments, the indication information is carried in at least one of: high-layer signaling; physical layer signaling; and beam reporting format.

In some embodiments, when the indication information is carried in the high-layer signaling, a first configuration is added to the high-layer signaling, and the first configuration is included in an RRC IE.

In some embodiments, the first configuration is a first parameter added in CSI-ReportConfig, and the first parameter is added when the CSI-ReportConfig satisfies a first specified condition; the first specified condition is that a reportQuantity parameter in the CSI-ReportConfig includes cri-RSRP or ssb-Index-RSRP.

In some embodiments, when the indication information is carried in the high-layer signaling, the high-layer signaling is an MAC CE; and the indication information is values of bits reserved in the MAC CE.

In some embodiments, when the indication information is carried in the physical layer signaling, the physical layer signaling is DCI; and the indication information is values of a specified quantity of bits added in the DCI.

In some embodiments, when the indication information is carried in the beam reporting format, the indication information is a second parameter added to reportQuantity of CSI-ReportConfig; the second parameter is used to indicate a reporting format; and the second parameter is added when a second specified condition is satisfied; the second specified condition is that the CSI-ReportConfig is a beam measurement report based on a CSI-RS or a beam measurement report based on an SS-Block.

In some embodiments, when indicating that the terminal measures the RSRP based on the limitation on the uplink MPE, the measurement result reported by the terminal includes: a first type of measurement value; or a first type of measurement value and a second type of measurement value, where the first type of measurement value is a measurement value of each beam based on power back-off caused by the limitation on the uplink MPE, and the second type of measurement value is a measurement value of each beam that is not based on the limitation on the uplink MPE.

In some embodiments, the first type of measurement value reported by the terminal is RSRP or a power back-off value.

In some embodiments, the first type of measurement value reported by the terminal and the second type of measurement value reported by the terminal are reported in a differential reporting manner.

In some embodiments, the first type of measurement value reported by the terminal and the second type of measurement value reported by the terminal are reported in one of following ways:
  in a first way: ranking by the first type of measurement value, and the first type of measurement value corresponds to the second type of measurement value for each beam, where a measurement value ranked in a first or last position is an absolute value of the measurement value, and measurement values in other ranking positions are differential values; and
  in a second way: ranking by the second type of measurement value, and the first type of measurement value corresponds to the second type of measurement value for each beam, where a measurement value ranked in a first or last position is an absolute value of the measurement value, and measurement values in other ranking positions are differential values of measurement values in a same type.

In some embodiments, the indication information is used for at least one CSI reporting of: periodic CSI reporting, aperiodic CSI reporting, semi-persistent CSI reporting.

In some embodiments, the indication information is sent when at least one of following conditions is satisfied:
  detecting that uplink signal received power of the terminal is lower than a threshold;
  determining that a priority of an uplink service of the terminal is higher than a priority threshold; and
  determining that a priority of an uplink service of the terminal is a specified priority.

In some embodiments, whether the terminal has the specified capability is determined according to a physical layer capability parameter of the terminal.

Figure 7:
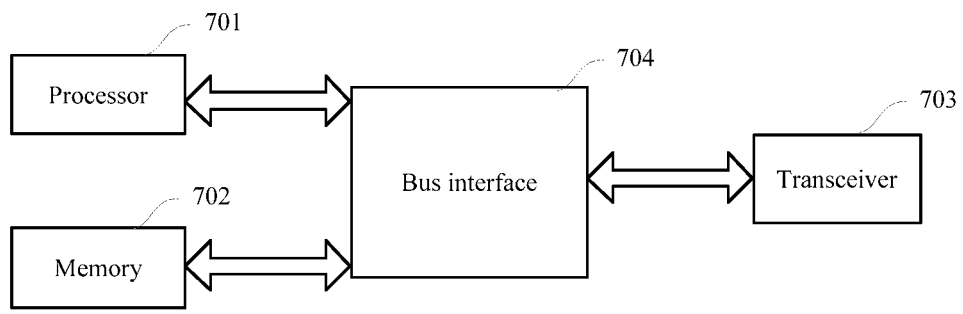
FIG. 7 is a structural schematic diagram of a communication device according to an embodiment of the disclosure.

Based on the same inventive concept, referring to FIG. 7, it is a structural schematic diagram of a communication device according to an embodiment of the disclosure. As shown, the communication device may include: a processor 701, a memory 702, a transceiver 703 and a bus interface 704.

The processor 701 is responsible for managing the bus architecture and general processing, and the memory 702 may store the data used by the processor 701 when performing the operations. The transceiver 703 is configured to receive and send the data under the control of the processor 701.

The bus architecture may include any numbers of interconnected buses and bridges, and specifically link various circuits of one or more processors represented by the processor 701 and the memory represented by the memory 702. The bus architecture may further link various other circuits such as peripheral device, voltage regulator and power management circuit, which are all well known in the art and thus will not be further described again herein. The bus interface provides an interface. The processor 701 is responsible for managing the bus architecture and general processing, and the memory 702 may store the data used by the processor 701 when performing the operations.

The procedure disclosed by the embodiment of the present disclosure may be applied in the processor 701 or implemented by the processor 701. In the implementation process, each step of the signal processing flow may be completed by the integrated logic circuit of hardware in the processor 701 or the instruction in the form of software. The processor 701 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present disclosure. The general-purpose processor may be a microprocessor or any conventional processor or the like. The steps of the method disclosed in combination with the embodiments of the present disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 702, and the processor 701 reads the information in the memory 702 and completes the steps of the signal processing flow in combination with its hardware.

In some embodiments, the processor 701 is configured to read computer instructions in the memory 702 and perform the following process:
  receiving indication information sent by a base station, where the indication information is used to indicate whether a terminal measures RSRP based on a limitation on uplink MPE;
  measuring RSRP of each beam according to the indication information, and reporting a measurement result for each beam to the base station.

Figure 8:
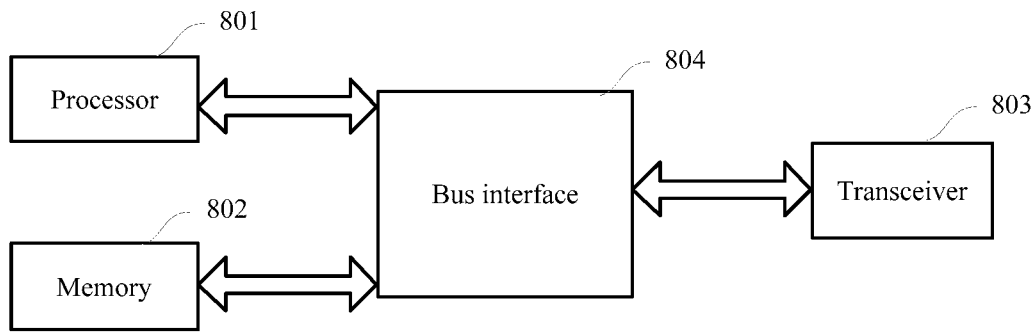
FIG. 8 is a structural schematic diagram of a communication device according to an embodiment of the disclosure.

Based on the same inventive concept, referring to FIG. 8, it is a structural schematic diagram of a communication device according to an embodiment of the disclosure. As shown, the communication device may include a processor 801, a memory 802, a transceiver 803 and a bus interface 804.

The processor 801 is responsible for managing the bus architecture and general processing, and the memory 802 may store the data used by the processor 801 when performing the operations. The transceiver 803 is configured to receive and send the data under the control of the processor 801.

The bus architecture may include any numbers of interconnected buses and bridges, and specifically link various circuits of one or more processors represented by the processor 801 and the memory represented by the memory 802. The bus architecture may further link various other circuits such as peripheral device, voltage regulator and power management circuit, which are all well known in the art and thus will not be further described again herein. The bus interface provides an interface. The processor 801 is responsible for managing the bus architecture and general processing, and the memory 802 may store the data used by the processor 801 when performing the operations.

The procedure disclosed by the embodiment of the present disclosure may be applied in the processor 801 or implemented by the processor 801. In the implementation process, each step of the signal processing flow may be completed by the integrated logic circuit of hardware in the processor 801 or the instruction in the form of software. The processor 801 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present disclosure. The general-purpose processor may be a microprocessor or any conventional processor or the like. The steps of the method disclosed in combination with the embodiments of the present disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 802, and the processor 801 reads the information in the memory 802 and completes the steps of the signal processing flow in combination with its hardware.

In some embodiments, the processor 801 is configured to read computer instructions in the memory 802 and perform the following process:
  receiving a measurement result of a terminal for each beam, where the measurement result includes description information, and the description information is used to indicate whether the measurement result considers power back-off caused by a limitation on uplink MPE; and
  performing beam scheduling based on the measurement result.

In some embodiments, the description information is represented by a specified quantity of bits.

In some embodiments, the measurement result reported by the terminal includes: a first type of measurement value; or a first type of measurement value and a second type of measurement value, where the first type of measurement value is a measurement value of each beam with considering the power back-off caused by the limitation on the uplink MPE, and the second type of measurement value is a measurement value of each beam without considering the power back-off caused by the limitation on the uplink MPE.

In some embodiments, the first type of measurement value reported by the terminal is RSRP or a power back-off value.

In some embodiments, the first type of measurement value reported by the terminal and the second type of measurement value reported by the terminal are reported in a differential reporting manner.

In some embodiments, the first type of measurement value reported by the terminal and the second type of measurement value reported by the terminal are reported in one of following ways:
  in a first way: ranking by the first type of measurement value, and the first type of measurement value corresponds to the second type of measurement value for each beam, where a measurement value ranked in a first or last position is an absolute value of the measurement value, and measurement values in other ranking positions are differential values; and
  in a second way: ranking by the second type of measurement value, and the first type of measurement value corresponds to the second type of measurement value for each beam, where a measurement value ranked in a first or last position is an absolute value of the measurement value, and measurement values in other ranking positions are differential values of measurement values in a same type.

Figure 9:
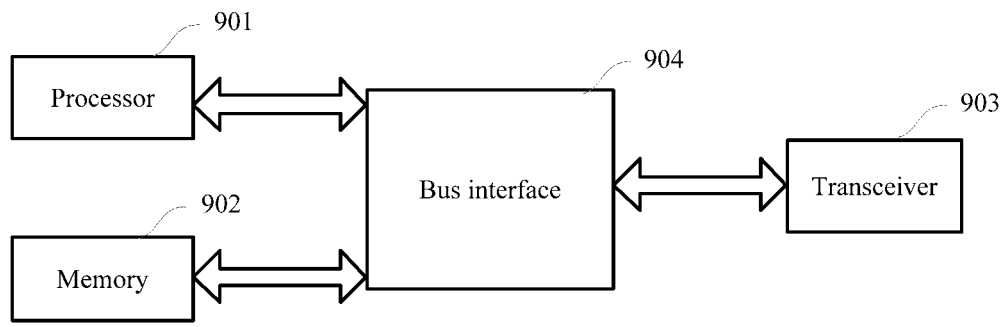
FIG. 9 is a structural schematic diagram of a communication device according to an embodiment of the disclosure.

Based on the same inventive concept, referring to FIG. 9, it is a structural schematic diagram of a communication device according to an embodiment of the disclosure. As shown, the communication device may include: a processor 901, a memory 902, a transceiver 903 and a bus interface 904.

The processor 901 is responsible for managing the bus architecture and general processing, and the memory 902 may store the data used by the processor 901 when performing the operations. The transceiver 903 is configured to receive and send the data under the control of the processor 901.

The bus architecture may include any numbers of interconnected buses and bridges, and specifically link various circuits of one or more processors represented by the processor 901 and the memory represented by the memory 902. The bus architecture may further link various other circuits such as peripheral device, voltage regulator and power management circuit, which are all well known in the art and thus will not be further described again herein. The bus interface provides an interface. The processor 901 is responsible for managing the bus architecture and general processing, and the memory 902 may store the data used by the processor 901 when performing the operations.

The procedure disclosed by the embodiment of the present disclosure may be applied in the processor 901 or implemented by the processor 901. In the implementation process, each step of the signal processing flow may be completed by the integrated logic circuit of hardware in the processor 901 or the instruction in the form of software. The processor 901 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present disclosure. The general-purpose processor may be a microprocessor or any conventional processor or the like. The steps of the method disclosed in combination with the embodiments of the present disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 902, and the processor 901 reads the information in the memory 902 and completes the steps of the signal processing flow in combination with its hardware.

In some embodiments, the processor 901 is configured to read computer instructions in the memory 902 and perform the following process:

reporting a measurement result for each beam when a terminal has a capability to measure RSRP according to MPE, and then a base station performs beam scheduling according to the measurement result, where the measurement result includes description information, and the description information is used to indicate whether the measurement considers power back-off caused by a limitation on uplink MPE.

In some embodiments, the terminal determines to report the measurement result with considering the power back-off caused by the limitation on the uplink MPE when detecting human body information and/or determining that an uplink service scenario is a preferred scenario.

Figure 10:
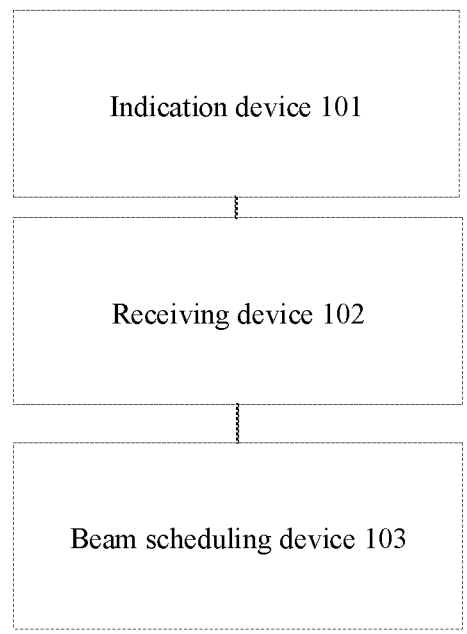
FIG. 10 is a structural schematic diagram of a network side device according to an embodiment of the disclosure.

Referring to FIG. 10, it is a structural schematic diagram of a network side device provided in the present disclosure. The network side device includes:

an indication device 101 configured to send indication information to a terminal when determining that the terminal has a specified capability, where the indication information is used to indicate whether the terminal measures RSRP based on a limitation on uplink MPE; and the specified capability is used to represent that the terminal has a capability to measure the RSRP according to the limitation on the uplink MPE;

a receiving device 102 configured to receive a measurement result for each beam reported by the terminal based on the indication information; and a beam scheduling device 103 configured to perform beam scheduling based on the measurement result.

In some embodiments, the indication information is carried in at least one of: high-layer signaling; physical layer signaling; beam reporting format.

In some embodiments, when the indication information is carried in the high-layer signaling, a first configuration is added to the high-layer signaling, and the first configuration is included in an RRC IE.

In some embodiments, the first configuration is a first parameter added in CSI-ReportConfig, and the first parameter is added when the CSI-ReportConfig satisfies a first specified condition; the first specified condition is that a reportQuantity parameter in the CSI-ReportConfig includes cri-RSRP or ssb-Index-RSRP.

In some embodiments, when the indication information is carried in the high-layer signaling, the high-layer signaling is an MAC CE; and the indication information is values of bits reserved in the MAC CE.

In some embodiments, when the indication information is carried in the physical layer signaling, the physical layer signaling is DCI; and the indication information is values of a specified quantity of bits added in the DCI.

In some embodiments, when the indication information is carried in the beam reporting format, the indication information is a second parameter added to reportQuantity of CSI-ReportConfig; the second parameter is used to indicate a reporting format; and the second parameter is added when a second specified condition is satisfied; the second specified condition is that the CSI-ReportConfig is a beam measurement report based on a CSI-RS or a beam measurement report based on an SS-Block.

In some embodiments, when indicating that the terminal measures the RSRP based on the limitation on the uplink MPE, the measurement result reported by the terminal includes: a first type of measurement value; or a first type of measurement value and a second type of measurement value, where the first type of measurement value is a measurement value of each beam based on power back-off caused by the limitation on the uplink MPE, and the second type of measurement value is a measurement value of each beam that is not based on the limitation on the uplink MPE.

In some embodiments, the first type of measurement value reported by the terminal is RSRP or a power back-off value.

In some embodiments, the first type of measurement value reported by the terminal and the second type of measurement value reported by the terminal are reported in a differential reporting manner.

In some embodiments, the first type of measurement value reported by the terminal and the second type of measurement value reported by the terminal are reported in one of following ways:

in a first way: ranking by the first type of measurement value, and the first type of measurement value corresponds to the second type of measurement value for each beam, where a measurement value ranked in a first or last position is an absolute value of the measurement value, and measurement values in other ranking positions are differential values; and in a second way: ranking by the second type of measurement value, and the first type of measurement value corresponds to the second type of measurement value for each beam, where a measurement value ranked in a first or last position is an absolute value of the measurement value, and measurement values in other ranking positions are differential values of measurement values in a same type.

In some embodiments, the indication information is used for at least one CSI reporting of: periodic CSI reporting, aperiodic CSI reporting, semi-persistent CSI reporting.

In some embodiments, the indication information is sent when at least one of following conditions is satisfied:

detecting that uplink signal received power of the terminal is lower than a threshold;

determining that a priority of an uplink service of the terminal is higher than a priority threshold; and determining that a priority of an uplink service of the terminal is a specified priority.

In some embodiments, whether the terminal has the specified capability is determined according to a physical layer capability parameter of the terminal.

Figure 11:
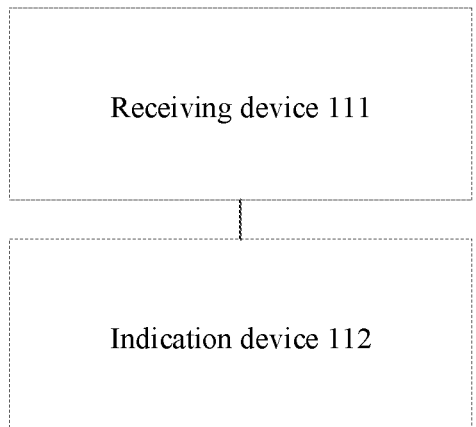
FIG. 11 is a structural schematic diagram of a network terminal according to an embodiment of the disclosure.

Referring to FIG. 11, it is a structural schematic diagram of a terminal according to an embodiment of the present disclosure, and the terminal includes:

a receiving device 111 configured to receive indication information sent by a base station, where the indication information is used to indicate whether a terminal measures RSRP based on a limitation on uplink MPE; and an indication device 112 configured to measure RSRP of each beam according to the indication information, and report a measurement result for each beam to the base station.

Figure 12:
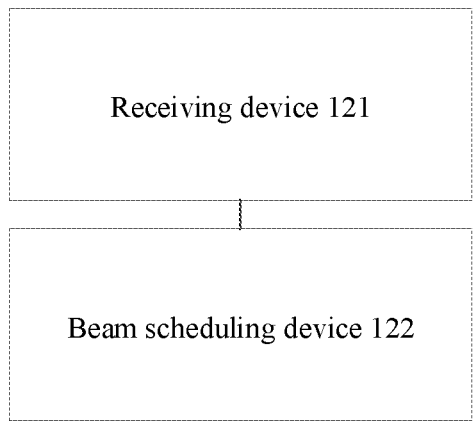
FIG. 12 is a structural schematic diagram of a network side device according to an embodiment of the disclosure.

Referring to FIG. 12, it is a structural schematic diagram of a network side device provided in the present disclosure. The network side device includes:

a receiving device 121 configured to receive a measurement result of a terminal for each beam, where the measurement result includes description information, and the description information is used to indicate whether the measurement result considers power back-off caused by a limitation on uplink MPE; and a beam scheduling device 122 configured to perform beam scheduling based on the measurement result.

In some embodiments, the description information is represented by a specified quantity of bits.

In some embodiments, the measurement result reported by the terminal includes: a first type of measurement value; or a first type of measurement value and a second type of measurement value, where the first type of measurement value is a measurement value of each beam with considering the power back-off caused by the limitation on the uplink MPE, and the second type of measurement value is a measurement value of each beam without considering the power back-off caused by the limitation on the uplink MPE.

In some embodiments, the first type of measurement value reported by the terminal is RSRP or a power back-off value.

In some embodiments, the first type of measurement value reported by the terminal and the second type of measurement value reported by the terminal are reported in a differential reporting manner.

In some embodiments, the first type of measurement value reported by the terminal and the second type of measurement value reported by the terminal are reported in one of following ways:

in a first way: ranking by the first type of measurement value, and the first type of measurement value corresponds to the second type of measurement value for each beam, where a measurement value ranked in a first or last position is an absolute value of the measurement value, and measurement values in other ranking positions are differential values; and in a second way: ranking by the second type of measurement value, and the first type of measurement value corresponds to the second type of measurement value for each beam, where a measurement value ranked in a first or last position is an absolute value of the measurement value, and measurement values in other ranking positions are differential values of measurement values in a same type.

Figure 13:
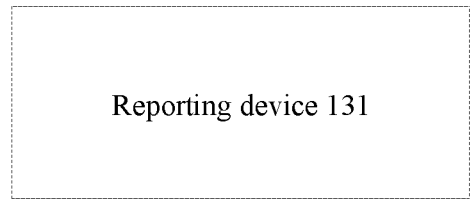
FIG. 13 is a structural schematic diagram of a terminal according to an embodiment of the disclosure.

Referring to FIG. 13, it is a structural schematic diagram of a terminal according to an embodiment of the present disclosure, and the terminal includes:

a reporting device 131 configured to report a measurement result for each beam when the terminal has a capability to measure RSRP according to MPE, and then a base station performs beam scheduling according to the measurement result, where the measurement result includes description information that is used to indicate whether the measurement considers power back-off caused by a limitation on uplink MPE.

In some embodiments, the terminal determines to report the measurement result with considering the power back-off caused by the limitation on the uplink MPE when detecting human body information and/or determining that an uplink service scenario is a preferred scenario.

Embodiments of the present disclosure further provide a computer-readable non-volatile storage medium, including a computer program. When the computer program is run on a computer, the computer program is configured to cause the computer to perform the steps of the above-mentioned beam scheduling method in the embodiments of the present disclosure.

The disclosure has been described above by reference to the block diagrams and/or flow charts showing the methods, devices (systems) and/or computer program products according to the embodiments of the disclosure. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, and then the instructions executed by the computer processor and/or another programmable data processing unit create the methods for implementing the functions and/or actions specified in the blocks of the block diagrams and/or flow charts.

Correspondingly, the disclosure can also be implemented by the hardware and/or software (including the firmware, resident software, microcode and the like). Further, the disclosure can adopt the form of computer program products on the computer usable or computer readable storage medium, which has the computer usable or computer readable program codes implemented in the medium, to be used by the instruction execution system or used in combination with the instruction execution system. In the context of the disclosure, the computer usable or computer readable storage medium can be any medium, which can contain, store, communicate with, transmit or transfer the programs, to be used by the instruction execution system, apparatus or device, or used in combination with the instruction execution system, apparatus or device.

What is claimed is:

1. A beam scheduling method, comprising:
    sending indication information to a terminal in response to determining that the terminal has a specified capability, wherein the indication information is used to indicate whether the terminal measures Reference Signal Received Power, RSRP, based on a limitation on uplink Maximum Permissible Exposure, MPE; and the specified capability is used to represent that the terminal has a capability to measure the RSRP based on the limitation on the uplink MPE;
    receiving a measurement result for each beam reported by the terminal based on the indication information; and
    performing beam scheduling based on the measurement result.

2. The method according to claim 1, wherein the indication information is carried in at least one of following information:
    high-layer signaling;
    physical layer signaling; or
    beam reporting format.

3. The method according to claim 2, wherein a first configuration is added to the high-layer signaling when the indication information is carried in the high-layer signaling, and the first configuration is comprised in a Radio Resource Control Information Element, RRC IE.

4. The method according to claim 3, wherein the first configuration is a first parameter added in CSI-ReportConfig, and the first parameter is added when the CSI-ReportConfig satisfies a first specified condition; and
    the first specified condition is that a reportQuantity parameter in the CSI-ReportConfig comprises Channel State Information-Reference Signal, CSI-RS, resource index and Reference Signal Received Power, cri-RSRP, or Synchronization signal block index and Reference Signal Received Power, ssb-Index-RSRP.

5. The method according to claim 2, wherein:
    the high-layer signaling is a Medium Access Control Control Element, MAC CE, when the indication information is carried in the high-layer signaling; and the indication information is values of bits reserved in the MAC CE;
the physical layer signaling is Downlink Control Information, DCI, when the indication information is carried in the physical layer signaling; and the indication information is values of a specified quantity of bits added in the DCI; or
when the indication information is carried in the beam reporting format, the indication information is a second parameter added to reportQuantity of CSI-ReportConfig; the second parameter is used to indicate a reporting format; and the second parameter is added when a second specified condition is satisfied; and the second specified condition is that the CSI-ReportConfig is a beam measurement report based on a Channel State Information Reference Signal, CSI-RS, or a beam measurement report based on a Synchronization Signal Block, SS-Block.

6. The method according to claim 1, wherein when the indication information indicates that the terminal measures the RSRP based on the limitation on the uplink MPE, the measurement result reported by the terminal comprises:
a first type of measurement value; or
a first type of measurement value and a second type of measurement value;
wherein the first type of measurement value is a measurement value of each beam based on power back-off caused by the limitation on the uplink MPE, and the second type of measurement value is a measurement value of each beam that is not based on the limitation on the uplink MPE.

7. The method according to claim 6, wherein:
the first type of measurement value reported by the terminal is RSRP or a power back-off value; or
the first type of measurement value reported by the terminal and the second type of measurement value reported by the terminal are reported in a differential reporting manner.

8. The method according to claim 7, wherein the first type of measurement value reported by the terminal and the second type of measurement value reported by the terminal are reported in one of following ways:
in a first way: ranking by the first type of measurement value, and the first type of measurement value corresponds to the second type of measurement value for each beam, wherein a measurement value ranked in a first or last position is an absolute value of the measurement value, and measurement values in other ranking positions are differential values; and
in a second way: ranking by the second type of measurement value, and the first type of measurement value corresponds to the second type of measurement value for each beam, wherein a measurement value ranked in a first or last position is an absolute value of the measurement value, and measurement values in other ranking positions are differential values.

9. The method according to claim 1, wherein:
the indication information is used for at least one Channel State Information, CSI, reporting of:
periodic CSI reporting, aperiodic CSI reporting, or semi-persistent CSI reporting;
or,
the indication information is sent when at least one of following conditions is satisfied:
detecting that receiving power of uplink signal at the terminal is lower than a threshold;
determining that a priority of an uplink service of the terminal is higher than a priority threshold; or
determining that a priority of an uplink service of the terminal is a specified priority;
or,
whether the terminal has the specified capability is determined based on a physical layer capability parameter of the terminal.

10. A beam scheduling method, comprising:
receiving indication information sent by a base station in response to determining that a terminal has a specified capability, wherein the indication information is used to indicate whether the terminal measures Reference Signal Received Power, RSRP, based on a limitation on uplink Maximum Permissible Exposure, MPE, and the specified capability is used to represent that the terminal has a capability to measure the RSRP based on the limitation on the uplink MPE;
measuring RSRP of each beam based on the indication information; and
reporting a measurement result for each beam to the base station.

11. A beam scheduling method, comprising:
receiving a measurement result of a terminal for each beam in response to determining that the terminal has a specified capability, wherein the measurement result comprises description information, and the description information is used to indicate whether the measurement result considers power back-off caused by a limitation on uplink Maximum Permissible Exposure, MPE, and the specified capability is used to represent that the terminal has a capability to measure the RSRP based on the limitation on the uplink MPE; and
performing beam scheduling based on the measurement result.

12. The method according to claim 11, wherein the description information is represented by a specified quantity of bits.

13. The method according to claim 11, wherein the measurement result reported by the terminal comprises:
a first type of measurement value; or
a first type of measurement value and a second type of measurement value;
wherein the first type of measurement value is a measurement value of each beam with considering the power back-off caused by the limitation on the uplink MPE, and the second type of measurement value is a measurement value of each beam without considering the power back-off caused by the limitation on the uplink MPE.

14. The method according to claim 13, wherein:
the first type of measurement value reported by the terminal is RSRP or a power back-off value; or
the first type of measurement value reported by the terminal and the second type of measurement value reported by the terminal are reported in a differential reporting manner.

15. The method according to claim 14, wherein the first type of measurement value reported by the terminal and the second type of measurement value reported by the terminal are reported in one of following ways:
in a first way: ranking by the first type of measurement value, and the first type of measurement value corresponds to the second type of measurement value for each beam, wherein a measurement value ranked in a first or last position is an absolute value of the measurement value, and measurement values in other ranking positions are differential values; and in a second way: ranking by the second type of measurement value, and the first type of measurement value corresponds to the second type of measurement value for each beam, wherein a measurement value ranked in a first or last position is an absolute value of the measurement value, and measurement values in other ranking positions are differential values.

16. A beam scheduling method, comprising:

reporting, by a terminal, a measurement result for each beam in response to having a specified capability to measure Reference Signal Received Power, RSRP, based on Maximum Permissible Exposure, MPE, so that a base station performs beam scheduling based on the measurement result;

wherein the measurement result comprises description information, and the description information is used to indicate whether the measurement considers power back-off caused by a limitation on uplink MPE.

17. The method according to claim 16, wherein the terminal determines to report the measurement result with considering the power back-off caused by the limitation on the uplink MPE when detecting human body information and/or determining that an uplink service scenario is a preferred scenario.

18. A communication apparatus, comprising: a processor, a memory and a transceiver; wherein the processor is configured to read computer instructions in the memory and perform the method of claim 1.

19. A communication apparatus, comprising: a processor, a memory and a transceiver; wherein the processor is configured to read computer instructions in the memory and perform the method of claim 10.

20. A communication apparatus, comprising: a processor, a memory and a transceiver; wherein the processor is configured to read computer instructions in the memory and perform the method of claim 16.

* * * * *